(12) United States Patent
Snyder et al.

(10) Patent No.: US 7,859,691 B2
(45) Date of Patent: Dec. 28, 2010

(54) PRINTER HAVING BI-LEVEL OPERATIONAL MODES

(75) Inventors: Trevor James Snyder, Newberg, OR (US); Cheng-Sung (Joel) Chan, West Linn, OR (US); Walter Sean Harris, Portland, OR (US); Paul Jeremy Woodward, West Linn, OR (US); Shell Thomas Haffner, Tualatin, OR (US); James B. Campbell, Beaverton, OR (US)

(73) Assignee: Xerox Corporation, Norwalk, CT (US)

( * ) Notice: Subject to any disclaimer, the term of this patent is extended or adjusted under 35 U.S.C. 154(b) by 1136 days.

(21) Appl. No.: 11/445,601

(22) Filed: Jun. 2, 2006

(65) Prior Publication Data

US 2007/0279665 A1 Dec. 6, 2007

(51) Int. Cl.
*G06F 3/12* (2006.01)
*G06K 15/00* (2006.01)

(52) U.S. Cl. .................. 358/1.13; 358/1.15; 358/1.18

(58) Field of Classification Search ............... 358/1.13, 358/1.9, 1.1, 1.15, 1.18
See application file for complete search history.

(56) References Cited

U.S. PATENT DOCUMENTS

| | | | |
|---|---|---|---|
| 5,394,251 A | 2/1995 | Aikens | |
| 6,198,469 B1 | 3/2001 | Tjandrasuwita | |
| 6,295,136 B1 * | 9/2001 | Ono et al. | 358/1.15 |
| 6,373,990 B1 | 4/2002 | Ushida et al. | |
| 6,578,944 B1 | 6/2003 | Kamei et al. | |
| 6,753,973 B2 | 6/2004 | Hashimoto et al. | |
| 2003/0095269 A1 * | 5/2003 | Kubo et al. | 358/1.9 |
| 2005/0280838 A1 * | 12/2005 | Kanai et al. | 358/1.1 |
| 2006/0187479 A1 * | 8/2006 | Kikuchi | 358/1.13 |

* cited by examiner

*Primary Examiner*—James A Thompson
(74) *Attorney, Agent, or Firm*—Maginot, Moore & Beck LLP

(57) ABSTRACT

A process enables a user to alter all the operational modes of a printer through a single parameter selection. The process includes selecting a group of operational parameter sets for a print process, the group selection being made with reference to one of an operational mode and a characteristic parameter; and selecting a set of operational parameters from the selected group of operational parameter sets, the set selection being made with reference to the other of the operational mode and the characteristic parameter.

14 Claims, 4 Drawing Sheets

PRINTER HAVING BI-LEVEL OPERATIONAL MODES

TECHNICAL FIELD

This disclosure relates generally to printers having different modes of operation and, more particularly, to printers having different modes of operation for print speed and quality.

BACKGROUND

As printing technology continues to be progressively robust, efforts are made to develop a printer that meets a wide range of printing needs. The technology used to implement printers is versatile and capable of implementing a variety of printing techniques. Consequently, printers with a wide range of operational modes can be developed to provide a number of printing options that should meet most needs of the printer's customer base. Not only does a printer have to satisfy these needs, but it also should perform its tasks in a user friendly manner. Therefore, the customer interface can be as important a component of a printer as the technology employed to generate the printed output.

The downside of implementing a multitude of printing options in a single machine is the customer's limited ability to understand the differences in the various operational modes and which modes best meet their needs. The value offered by multiple printing modes can be offset by the complexity of multiple modes. Customers generally perceive printers that have four or more operational modes as not being user friendly. This perception arises from the need to consult a written manual to understand the various differences in the modes and, sometimes, a trial and error approach of using the various modes to understand what the manual means. For example, in one type of a solid ink printer, the photo mode is used to generate photograph quality images. One by-product of this operational mode is its relatively quiet operation. Consequently, a user seeking a quieter environment may select the photo mode. This selection, however, also results in an increased cost per page generated because the photo images contain more ink. Memorizing the ramifications for a mode selection or consulting with a user manual to understand them is not perceived well by customers.

SUMMARY

In order to provide users with more control over the characteristics of their printers without significantly increasing the complexity of the user interface with the machine, a new printer and control process have been developed. The process enables a user to alter all the operational modes of a printer through a single parameter selection. The process includes selecting a group of operational parameter sets for a print process, the group selection being made with reference to one of an operational mode and a characteristic parameter; and selecting a set of operational parameters from the selected group of operational parameter sets, the set selection being made with reference to the other of the operational mode and the characteristic parameter.

A printer that implements the control process includes a mode selector for selecting an operational mode from a plurality of operational modes, each operational mode having at least two sets of operational parameters associated with it, and a characteristic selector for selecting a characteristic parameter, the characteristic parameter identifying the operational parameter set associated with the operational parameter that is to be used for controlling a print process. The characteristic parameter effectively doubles the number of operational modes for the printer, but only requires the user to understand whether the characteristic is or is not being implemented in the currently defined operational mode.

BRIEF DESCRIPTION OF THE DRAWINGS

The foregoing aspects and other features of an ink printer implementing an offset solid ink printing process are explained in the following description, taken in connection with the accompanying drawings, wherein.

DETAILED DESCRIPTION

Figure 1:
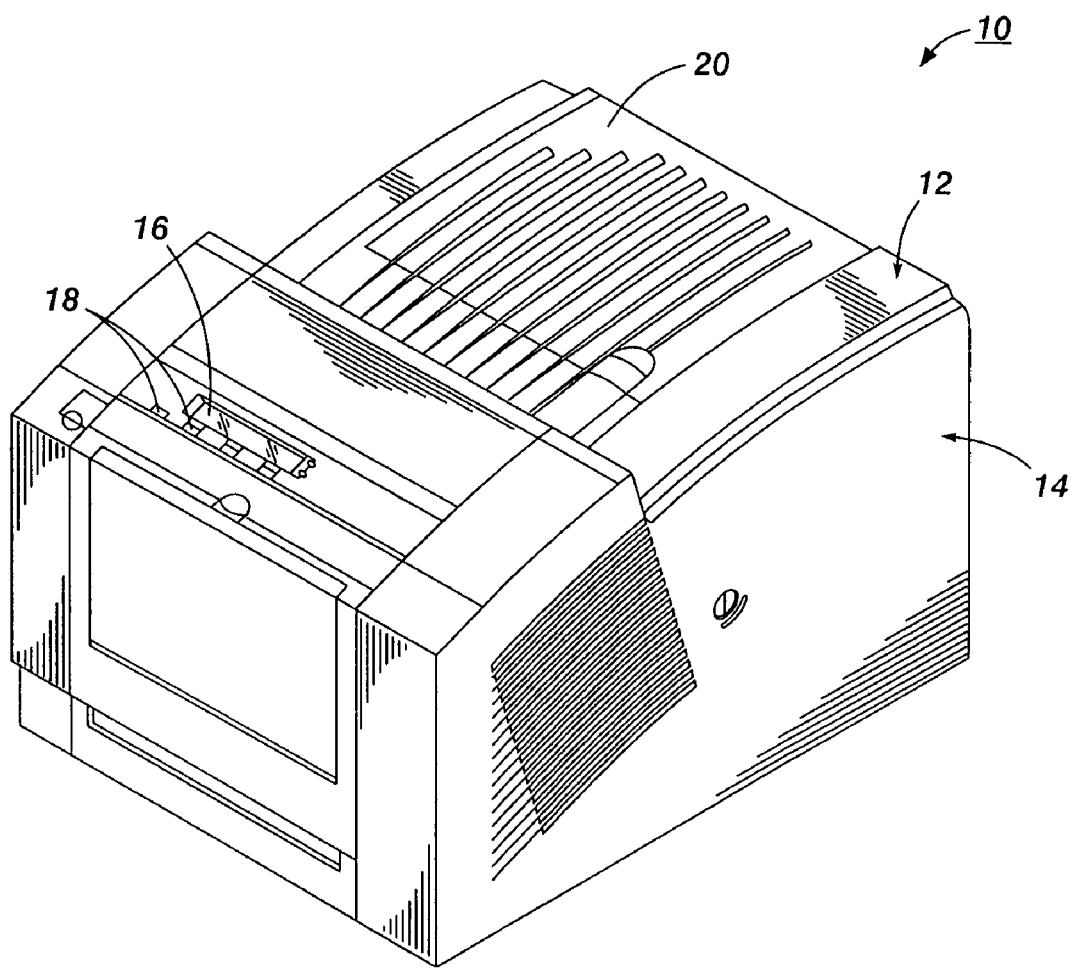
FIG. 1 is a perspective view of an ink printer having bi-level operational modes.
Figure 2:
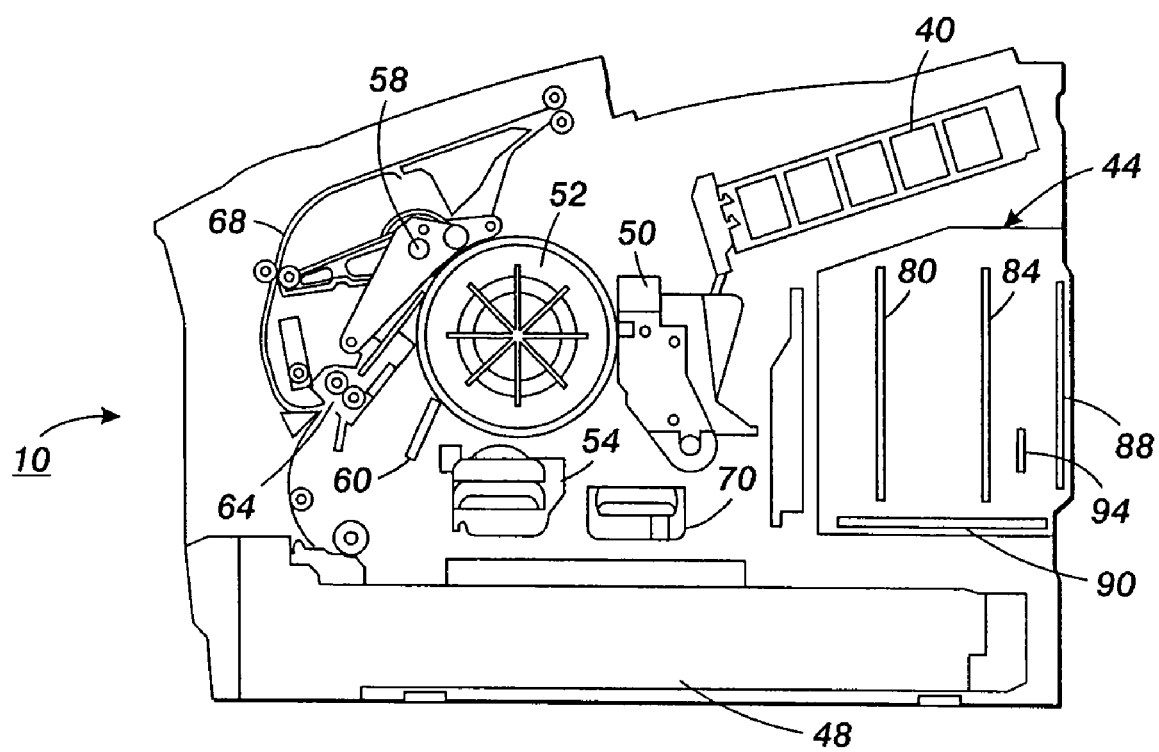
FIG. 2 is a side view of the printer shown in FIG. 1 that depicts the major subsystems of the ink printer.

Referring to FIG. 1, there is shown a perspective view of an ink printer 10 that implements an offset print process. The reader should understand that the embodiment discussed herein may be implemented in many alternate forms and variations. In addition, any suitable size, shape or type of elements or materials may be used.

FIG. 1 shows an ink printer 10 that includes an outer housing having a top surface 12 and side surfaces 14. A user interface display, such as a front panel display screen 16, displays information concerning the status of the printer, and user instructions. Buttons 18 or other control elements may be used to select or define parameters for controlling operation of the printer. The buttons may be located adjacent the user interface display 16 or they may be provided at other locations on the printer. Additionally or alternatively, buttons 18 may be implemented as radio buttons on the display 16. In such an embodiment, the user display 16 also incorporates a touch screen to provide input data to the printer controller.

An ink feed system delivers ink to an ink jet printing mechanism (not shown) that is contained inside the housing. The ink feed system may be accessed through the hinged ink access cover 20 that opens to reveal keyed openings and feed channels having an ink load linkage element. The ink access cover and the ink load linkage element may operate as described in U.S. Pat. No. 5,861,903 for an Ink Feed System, issued Jan. 19, 1999 to Crawford et al. In one embodiment, the ink jet printing mechanism ejects ink onto a rotating intermediate imaging member and the image is transferred to a sheet of media. In another embodiment, the ink jet printing mechanism ejects the ink directly onto a media sheet.

Figure 3:
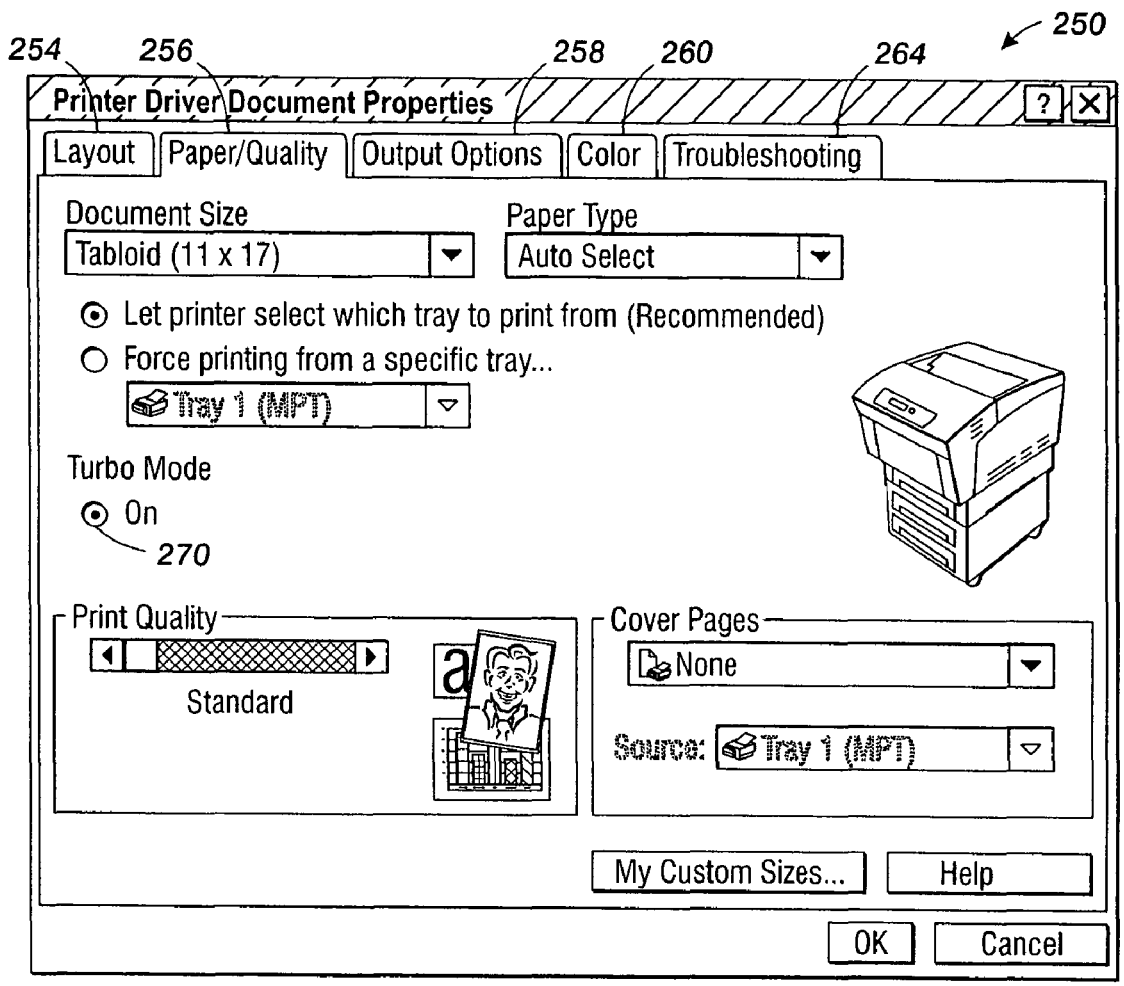
FIG. 3 is a screen depicting a screen implementation of a software button for enabling print characteristic selection in a printer driver

As shown in FIG. 3, one embodiment of the ink printer 10 may include an ink loading subsystem 40, an electronics module 44, a paper/media tray 48, a print head 50, an intermediate imaging member 52, a drum maintenance subsystem 54, a transfer subsystem 58, a wiper subassembly 60, a paper/media preheater 64, a duplex print path 68, and an ink waste tray 70. In brief, solid ink sticks are loaded into ink loader 40 through which they travel to a melt plate (not shown). At the melt plate, the ink stick is melted and the liquid ink is diverted to a reservoir in the print head 50. The ink is ejected by piezoelectric elements through apertures in plates to form an image on a liquid layer that is supported by the intermediate imaging member 52 as the member rotates. An intermediate imaging member heater is controlled by a controller to maintain the imaging member within an optimal temperature range for generating an ink image and transferring it to a sheet of recording media. A sheet of recording media is removed from the paper/media tray 48 and directed into the paper pre-heater 64 so the sheet of recording media is heated to a more optimal temperature for receiving the ink image. A synchronizer delivers the sheet of the recording media so its movement between the transfer roller in the transfer subsystem 58 and the intermediate image member 52 is coordinated for the transfer of the image from the imaging member to the sheet of recording media.

A duplex image includes a first image that is transferred from the intermediate imaging member onto a first side of a recording media sheet followed by a second image that is transferred from the intermediate imaging member onto the reverse side of the recording media sheet to which the first image was transferred. If a duplex image is to be transferred to the reverse side of a sheet, the reverse side of the sheet is presented to the intermediate imaging member by directing the sheet through the duplex print path 68 after it has passed through the transfer roller for the transfer of the first image. As the transfer process is repeated, the second image is transferred from the intermediate imaging member 52 to the reverse side of the sheet imaged during the previous transfer cycle. The sheet bearing the duplex image is then ejected by ejection rollers and deposited in the output tray.

The operations of the ink printer 10 are controlled by the electronics module 44. The electronics module 44 includes a power supply 80, a main board 84 with a controller, memory, and interface components (not shown), a hard drive 88, a power control board 90, and a configuration card 94. The power supply 80 generates various power levels for the various components and subsystems of the printer 10. The power control board 90 regulates these power levels. The configuration card contains data in nonvolatile memory that defines the various operating parameters and configurations for the components and subsystems of the printer 10. The hard drive stores data used for operating the ink printer and software modules that may be loaded and executed in the memory on the main board 84. The main board 84 includes the controller that operates the printer 10 in accordance with the operating program executing in the memory of the main board 84. The controller receives signals from the various components and subsystems of the printer 10 through interface components on the main board 84. The controller also generates control signals that are delivered to the components and subsystems through the interface components. These control signals, for example, drive the piezoelectric elements to expel ink through print head apertures to form the image on the imaging member 52 as the member rotates past the print head.

As is known, buttons 18 may be used as mode selectors to select an operational mode for a printer from a plurality of operational modes. This plurality of modes may include, for example, a photo mode, an enhanced mode, a standard mode, and a fast mode. These modes refer to the print quality of the produced image or to the speed of image production. In the photo mode, the print image has a higher resolution and higher ink pile to provide greater detail and color gamut, for example. The enhanced and standard modes provide good quality, but with less resolution and ink pile, while the fast mode provides adequate print quality at a level that enables the highest output production of the printer.

Predetermined operational modes are the main adjustments that are available for modifying the operation of a printer; however, users may select an operational mode to obtain a collateral benefit of a particular mode without regard for an attendant cost. For example, a user may select a higher image quality mode, not to obtain the thicker pile of the resulting image, but instead because the printer is slightly quieter running in that mode. The user may, in fact, select the mode for some reasons not at all related to printing, such as being able to use a cell phone for non-business communication while a job is printing. Unbeknownst to the user, however, the quieter operation is obtained at a cost in the printing resources used to produce the higher quality. In another example, a user wanting to print images on special media, such as glossy or thick media sheets, may select a higher quality print mode simply because the media is different. By providing a print characteristic selector that affects all modes of operation, the user may instinctively learn that they can obtain the desired collateral property without unnecessarily increasing the cost of operation, for example.

In order to enable a user to select printer operational modes that optimize the user's satisfaction with the printer, bi-level modification of all operational modes is provided. To provide bi-level modification of the operational modes in the example discussed above, a button 18 is provided for selecting a characteristic parameter. The button may be implemented as a pushbutton actuator located on a control panel of a printer, such as one of the buttons 18 shown in the figure. In another embodiment, the characteristic parameter selector may be implemented as a software button presented in a print job page for a printer driver. In another embodiment, the button may be implemented both with a pushbutton actuator and as a software button.

The characteristic parameter may represent a simple print characteristic that users instinctively understand. For example, speed may be used as a print characteristic with the attendant bi-level values of either high or not high. Likewise, quality may be used as the print characteristic with the bi-level value of high or not high. In another embodiment, an environmental condition may be used for the print characteristic, such as, "quiet." The bi-level values for such a characteristic may indicate that the mode is operating quietly or not. In another embodiment, the print characteristic may be designated with a term that is more subjectively understood as being indicative of mode status, such as, "turbo." Whether "turbo" is on or off, determines the characteristic parameter selected for modifying the operational mode of the printer when its next print operation is commenced.

The selection of a bi-level value for the print characteristic affects all of the operational modes for the printer. For example, if the speed characteristic is used, then the value "fast" means that all of the modes are operating with the highest production possible production rate. Each mode, however, is operating at a speed that is different than the other operational modes. For example, the fastest speed for the photo mode is less than the fastest speed for the other three modes, as it enables the printer to generate photo quality print images at the highest production rate. What the user understands is that each mode now performs to generate its highest output production without sacrificing the minimum print quality associated with the mode.

Where the bi-level modification is most appreciated is the learned behavior of the user to associate other characteristics with the bi-level characteristic. That is, the user learns that by disabling the fast characteristic that all of the operational modes for the printer operate more quietly, enable more robust media handling, or provide better image quality for special media. Thus, the user begins to enable and disable the print characteristic parameter to achieve certain performance characteristics for the printer without having to consult a manual or memorize minute differences between myriad modes.

In one embodiment, each of four operational modes has two sets of operational parameters. Thus, the printer is capable of implementing eight different parameter sets. The parameters in each set may include, for example, imaging drum speed, cam loading, transfer roller speed, media heater temperature, and the like. If each parameter set were defined as a separate mode, then users would likely consider the printer to be complicated or user unfriendly. By using a bi-level characteristic, the user understands the printer has having four modes with two flavors for each mode. The user need not know the nuances of each mode level in order to understand how to configure the printer to meet the user's expectations. Additionally, the use of a single bi-level characteristic to select one set of operational parameters from a group of operational parameter sets for each mode means this type of control may be implemented with fewer buttons or mode identifications. Rather than requiring eight different buttons or mode identifiers, the eight operational parameter sets may be defined, for example, with four mode identifiers and a single bi-level characteristic. Such an implementation may, for example, be achieved with two buttons. One button is used to rotate a mode field in the display 16 through the mode identifiers and the other button is used to rotate a bi-level characteristic between being "on" or "off."

In another embodiment, the printer driver includes a parameter selection screen, such as the screen 250 shown in FIG. 3. The screen includes a plurality of tabs 254, 256, 258, 260, and 264 that may be selected to adjust various printing parameters for a print job. In the depicted screen 250, the print quality tab 256 has been selected. Within this selected tab, a turbo mode software button 270 has been implemented. By clicking on the button 270, the user may activate or deactivate the turbo mode for the print job being programmed through the driver.

Figure 4:
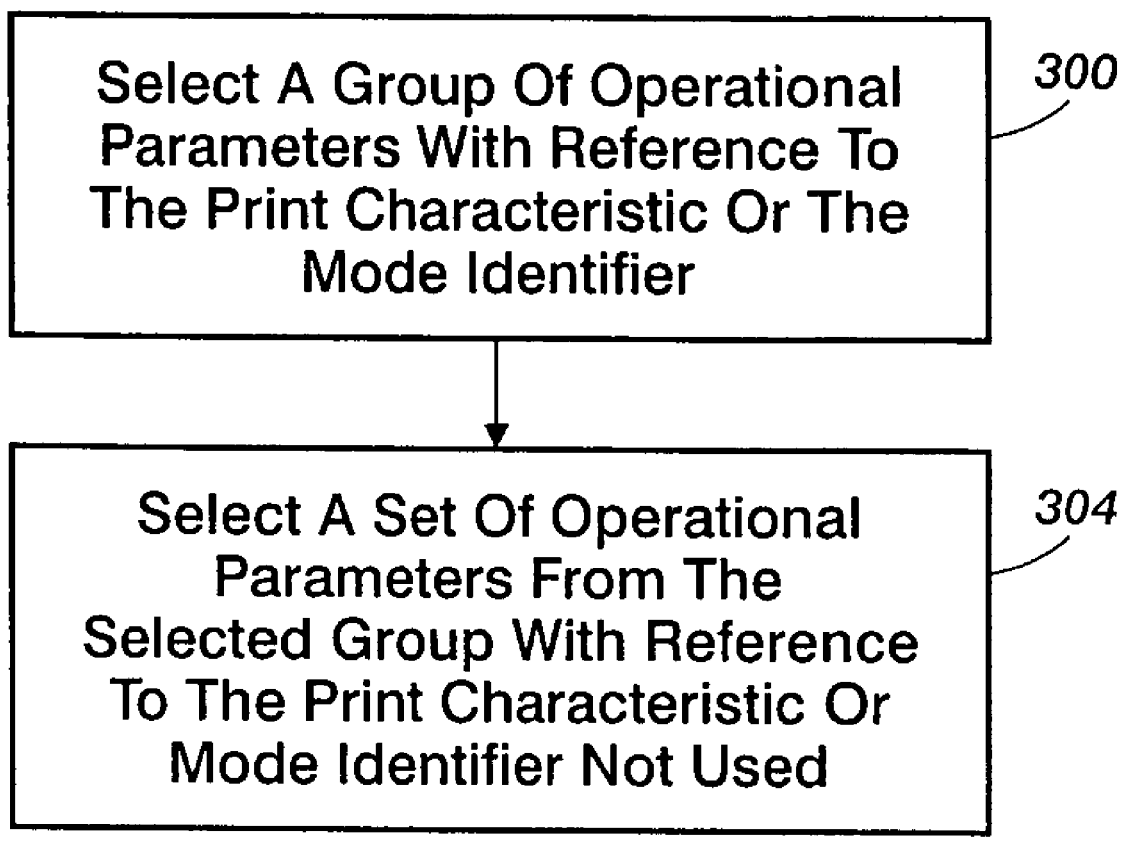
FIG. 4 is a flow diagram of a process that may be implemented by the controller shown in FIG. 2.

A printer that uses a bi-level characteristic to modify its operational modes may be used to address a user that "overcompensates" for an atypical print job. As noted above, a user may perceive that the operational mode of a printer must be adjusted to at least the next higher level for jobs printed with a particular special media when, in fact, no such adjustment is needed. By offering the bi-level distinction for each operational mode, the user is encouraged to select the bi-level value that the user instinctively senses is able to compensate for the different media without absorbing the cost of the next highest operational mode. Likewise, the user who selects an operational mode to obtain a collateral benefit without regard for the attendant cost may be satisfied with the slight adjustment provided by bi-level characteristic selection within the operational mode typically used for the print job. Thus, the bi-level characteristic may reduce the costs of printer usage arising from unnecessary operational mode adjustments A controller for a printer that uses a bi-level characteristic to select a set of operational parameters may use the exemplary process shown in FIG. 4. That process includes selecting a group of operational parameter sets for a print process, the group selection being made with reference to one of an operational mode and a characteristic parameter (block 300). After the group selection is made, the process then selects a set of operational parameters from the selected group of operational parameter sets. The operational parameter set selection being made with reference to the other of the operational mode and the characteristic parameter (block 304). This process enables a user to select a value for either the characteristic parameter or the operational mode and then select a value for the other variable to determine an operational parameter set. When the operational parameter is set first, the group consists of the operational parameter sets associated with the selected mode. The characteristic value then determines which set among those operational parameter sets is selected for processing print jobs until a new selection is made. If the characteristic parameter is selected first, the group consists of all the operational parameter sets that correspond to the selected characteristic parameter value. The mode selection then determines the operational parameter set from that group that is used to perform the printing process.

Once a printer having the bi-level characteristic selector is installed in a facility, the users will note the availability of the bi-level selection for each mode. As they begin to use it, they develop an intuitive feel for the differences that the bi-level setting provides. If the user's eye is more sensitive to image quality differences, then the user notices the slightly improved image quality provided when the "turbo" feature is off. If the user is time sensitive, the user develops an appreciation for the faster output rate experienced when the "turbo" feature is activated. If the user is multi-tasking and using a phone while copying, then the "turbo" feature is likely to be deactivated in order to reduce further the quiet operation of the printer. That is, the users begin to adapt their selection of an operational mode level to their experienced differences rather to the specified features delineated in a user manual. Consequently, bi-level selection is performed in a more instinctive manner that enhances customer satisfaction with the printer.

Those skilled in the art will recognize that numerous modifications can be made to the specific implementations described above. For example, those skilled in the art will recognize that while the embodiments have been discussed with reference to a bi-level characteristic, multi-level characteristics may be used. Also, while the embodiments above have been described with reference to an offset printer, this type of operational parameter set selection may be performed with other types of printers. Therefore, the following claims are not to be limited to the specific embodiments illustrated and described above. The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

We claim:

1. A process for identifying a set of operational parameters for a print process comprising:
   selecting a group of operational parameter sets for a print process, the group selection being made with reference to one of a value for an operational mode and a value for a characteristic parameter, the operational mode being configured to have one value selected from a plurality of values and the characteristic parameter being configured to have one value selected from a set of two values only, each group of operational parameter sets for an operational mode corresponding to one of the values in the plurality of operational mode values has two sets of operational parameters and each set of operational parameters in a group of operational parameter sets for a value of an operational mode corresponds to only one value in the set of two values for the characteristic parameter;
   selecting a set of operational parameters from the selected group of operational parameter sets, the set selection being made with reference to the value for the other of the operational mode and the characteristic parameter; and operating a printer in accordance with the selected set of operational parameters.

2. The process of claim 1 wherein the plurality of operational mode values consists of four values with each value corresponding to only one of four operational modes.

3. The process of claim 2 wherein the four operational modes are four image quality modes.

4. The process of claim 3 wherein the plurality of values for the four image quality operational modes are photo, enhanced, standard, and fast.

5. The process of claim 1 wherein the characteristic parameter is a speed parameter and the value for the speed parameter selects one of the two sets of operational parameters in the group of operational parameter sets for a value of an operational mode.

6. The process of claim 1 wherein the characteristic parameter is a quality parameter and the value for the quality parameter selects one of the two sets of operational parameters in the group of operational parameter sets for a value of an operational mode.

7. The process of claim 1 wherein the characteristic parameter is an environmental parameter and the value for the environmental parameter selects one of the two sets of operational parameters in the group of operational parameter sets for a value of an operational mode.

8. A printer comprising:
a mode selector configured to select an operational mode from a plurality of operational modes, each operational mode having only two sets of operational parameters associated with the operational mode; and
a characteristic selector configured to select one of only two values for a speed parameter, the value selected for the speed parameter identifies and selects one set of the two sets of operational parameters associated with an operational mode for control of a print process.

9. The printer of claim 8 wherein the plurality of operational modes consists of four image quality modes.

10. The printer of claim 9 wherein the four image quality operational modes are photo, enhanced, standard, and fast.

11. The printer of claim 8 wherein the characteristic selector is a pushbutton actuator on a control panel of the printer.

12. The printer of claim 8 wherein the characteristic selector is a selection button in a printer driver.

13. A printer comprising:
a mode selector configured to select an operational mode from a plurality of operational modes, each operational mode having only two sets of operational parameters associated with the operational mode; and
a characteristic selector configured to select one of only two values for a quality parameter, the value selected for the quality parameter identifies and selects one set of the two sets of operational parameters associated with an operational mode for control of a print process.

14. A printer comprising:
a mode selector configured to select an operational mode from a plurality of operational modes, each operational mode having only two sets of operational parameters associated with the operational mode; and
a characteristic selector configured to select one of only two values for an environmental parameter, the value selected for the environmental parameter identifies and selects one set of the two sets of operational parameters associated with an operational mode for control of a print process.

* * * * *